April 14, 1959
J. J. FELTS
2,881,875
WHEEL BRAKE DRUM
Filed Aug. 13, 1956
2 Sheets-Sheet 1
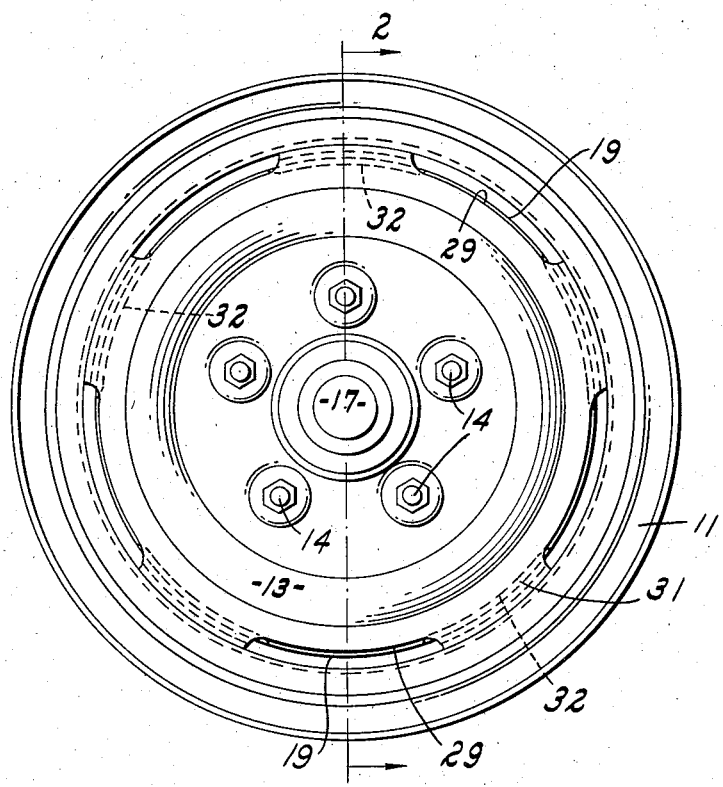
FIG. 1
FIG. 4
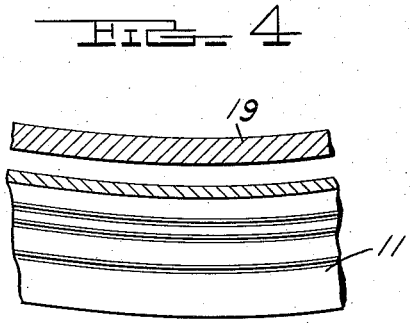
J. J. FELTS
INVENTOR.
E. C. McRAE
BY J. R. FAULKNER
T. H. OSTER
ATTORNEYS April 14, 1959  J. J. FELTS  2,881,875
WHEEL BRAKE DRUM
Filed Aug. 13, 1956  2 Sheets-Sheet 2
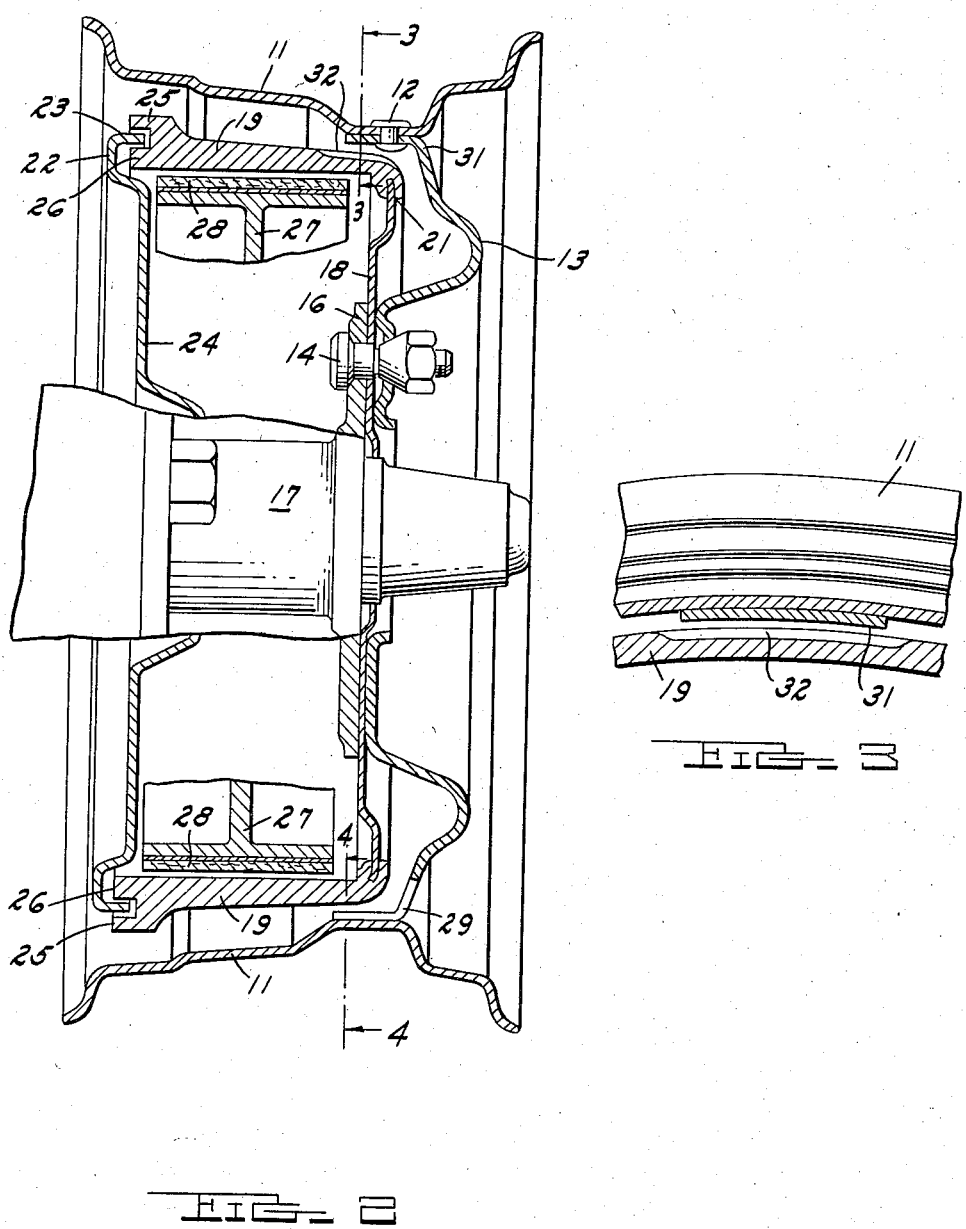
J. J. FELTS
E. C. McRAE
J. R. FAULKNER
T. H. OSTER
INVENTOR.
BY
ATTORNEYS

United States Patent Office 2,881,875
Patented Apr. 14, 1959

2,881,875

WHEEL BRAKE DRUM

Jerome J. Felts, Walled Lake, Mich., assignor to Ford Motor Company, Dearborn, Mich., a corporation of Delaware Application August 13, 1956, Serial No. 603,639

1 Claim. (Cl. 188—218)

This invention relates to brakes and more particularly to a new and novel brake drum which may be used with motor vehicle wheels.

In the current automotive trend, the wheels of a vehicle are getting smaller thus reducing the effective internal area for the installation of the brake. As a result of this trend, it is oftentimes necessary to increase the width of the brake without increasing the diameter in order to obtain the maximum amount of brake friction area. In the normal installation of a front wheel brake, the width of the brake is extremely important because of the front suspension parts which necessarily occupy a considerable amount of space. As a result, widening the brake becomes a most difficult problem.

In the applicant's novel structure, he has used a very wide brake within the confines of a small wheel. Ordinarily the drum would strike the wheel at the point of juncture of the wheel disc and the wheel rim. The applicant has scalloped the brake drum at predetermined points along the outer periphery to provide clearance at the point of assemblage of the disc to the rim. In this way the applicant is able to take advantage of the extremely limited internal wheel area. Scalloping also permits the brake drum to be cooled along its outer peripheral surface.

Through the use of the applicant's invention, it is commercially possible to use a brake having greater width in a small wheel at a minimum of cost. Expensive re-design of both the wheel and the brake is obviated. Furthermore, the invention readily adapts itself to mass production and can be provided at a minimum of cost.

Other objects and advantages of the invention will be made apparent as this description proceeds, particularly when considered in connection with the accompanying drawings wherein:

Figure 1 is a side elevational view of the outboard side of a motor vehicle wheel incorporating the present invention.

Figure 2 is a vertical cross-sectional view taken on the plane indicated by the line 2—2 of Figure 1.

Figure 3 is an enlarged vertical cross-sectional view taken on the plane indicated by the line 3—3 of Figure 2.

Figure 4 is a vertical cross-sectional view taken on the plane indicated by the line 4—4 of Figure 2.

Referring to the drawings, the reference character 11 indicates a conventional wheel rim attached by rivets 12 to a wheel disc 13. Adjacent its inner periphery the annular wheel disc 13 is conventionally connected by bolts 14 to the radially extending flange 16 of the wheel hub 17. A tire (not shown) is conventionally carried by the wheel rim 11.

Also connected to the radial flange 16 of the wheel hub by the attaching bolts 14 is the annular supporting flange 18 of the enlarged width axial extending brake drum 19. The radially inner portion of the supporting flange is located between the hub flange 16 and the wheel disc 13, while the radially outer portion 21 thereof supports the cast brake drum 19.

A stationary brake backing plate 24 is fixedly mounted upon the wheel hub 17, and at its outer periphery is formed with a reverse bent portion 22 terminating in an axially extending marginal flange 23. The adjacent portion of the brake drum 19 is formed with radially spaced flanges 25 and 26 cooperating with adjacent portions of the backing plate to form a dust seal and water trap.

A pair of brake shoes 27 are provided carrying brake linings 28 engageable with the inner surface of the brake drum 19 in a conventional manner.

The wheel disc 13 is provided with a plurality of scalloped radially inwardly recessed sections 29 between the web bent axial portions 31 which are secured by the aforementioned rivets 12 or other means to the wheel rim 11. The brake drum 19 is provided with a plurality of inwardly scalloped sections 32 on the outer periphery of the brake drum in substantial axial alignment with the web bent portions of the wheel disc. Scalloped sections 32 are somewhat wider than the web bent portion 31 and extends axially beyond the full extent of the web portion 31 where it blends into the normal thickness of the drum. Furthermore, the spaces between the scalloped sections are in alignment with the scalloped recesses in the wheel disc. Thus it can be seen that the brake drum and the wheel disc are in cooperative nesting, spaced apart relationship throughout the peripheral surface of the brake drum. Scalloping of the brake drum as intended by the applicant does not weaken the brake drum. Not only is the installation made without restriction or impediment, but sufficient space is permitted between the wheel and the drum so that effective cooling of the brake drum takes place. It is also possible to obtain additional clearance by welding the bent portion web 31 to the central portion 12 of the rim 11.

It will be understood that the invention is not to be limited to the exact construction shown and described, but that various changes and modifications may be made without departing from the spirit and scope of the invention, as defined in the appended claim.

What is claimed is:

An improved wheel and brake construction of a type in which an enlarged width brake drum is used in a wheel of a relatively small diameter, said brake drum utilizing the maximum amount of space while maintaining an equal distance separation from the wheel rim and disc for the passage of air, comprising in combination a hub, a scalloped wheel disc, bolt means securing said disc to said hub, said disc having a plurality of web sections medially of said scallops, said web sections being bent axially inwardly at their outer ends to form bent end portions, the bent end portions of said web sections being disposed in spaced apart radial alignment with said bolt means, attaching means securing said bent end portions to said rim, said wheel rim, wheel disc and hub being assembled together and forming an annular brake drum receiving area extending axially from the inner edge of said rim to said wheel disc, a generally radially outwardly extending brake drum supporting flange secured to said wheel hub, said supporting flange including a first portion extending generally in the radial plane of the attachment means and the bolt means and a second portion offset axially outwardly of said first portion to provide a peripheral edge located adjacent said wheel disc and outwardly of the inner ends of the bent end portions of said web sections, a brake drum secured at its outer edge to the peripheral edge of said supporting flange, said brake drum extending axially inwardly and terminating in an inner edge adjacent to the inner edge of said rim to provide a brake drum of relatively enlarged width, said brake drum having a diameter which normally would prevent the brake drum from extending axially to occupy the brake drum receiving area within the confines of said bent end portions, a plurality of scalloped sections on the peripheral surface of said enlarged width brake drum adjacent said bent end portions, said scallops having a width greater than said bent sections and providing an equal space about said bent end portions in said brake drum in a radial plane, said scallops extending axially beyond the length of said web bent end portions to provide an equal space between said drum and said web bent end portions in an axial plane, said brake drum being nested within said wheel rim and disc whereby a predetermined continuous equal distance is maintained between the outer periphery of the brake drum and the internal portion of the rim and web bent end brake portions.

References Cited in the file of this patent

UNITED STATES PATENTS

| | | |
|---|---|---|
| 2,344,690 | Freer | Mar. 21, 1944 |
| 2,717,059 | Lyon | Sept. 6, 1955 |